United States Patent
Osugi

(10) Patent No.: US 11,429,751 B2
(45) Date of Patent: Aug. 30, 2022

(54) METHOD AND APPARATUS FOR ENCRYPTING AND DECRYPTING DATA ON AN INTEGRATED CIRCUIT

(71) Applicant: Rajant Corporation, Phoenix, AZ (US)

(72) Inventor: Kevin Osugi, Phoenix, AZ (US)

(73) Assignee: Rajant Corporation, Malvern, PA (US)

( * ) Notice: Subject to any disclaimer, the term of this patent is extended or adjusted under 35 U.S.C. 154(b) by 261 days.

(21) Appl. No.: 16/458,678

(22) Filed: Jul. 1, 2019

(65) Prior Publication Data
US 2021/0004495 A1    Jan. 7, 2021

(51) Int. Cl.
G06F 21/72    (2013.01)
H04L 9/06    (2006.01)
G06F 7/58    (2006.01)

(52) U.S. Cl.
CPC .............. *G06F 21/72* (2013.01); *G06F 7/584* (2013.01); *H04L 9/0618* (2013.01); *H04L 2209/12* (2013.01)

(58) Field of Classification Search
None
See application file for complete search history.

(56) References Cited

U.S. PATENT DOCUMENTS

| | | | |
|---|---|---|---|
| 6,694,430 B1 | 2/2004 | Zegelin et al. | |
| 7,127,616 B2 | 10/2006 | Kaneko | |
| 7,203,842 B2 | 4/2007 | Kean | |
| 7,303,136 B2 | 12/2007 | Tsunoda et al. | |
| 7,328,335 B1 | 2/2008 | Sundararajan et al. | |
| 7,333,613 B2 | 2/2008 | Courcambeck et al. | |
| 7,774,619 B2 | 8/2010 | Paaske et al. | |
| 7,975,151 B2 | 7/2011 | Coenen | |
| 8,045,712 B2 * | 10/2011 | Daemen .............. | G06F 12/1408 380/264 |

(Continued)

FOREIGN PATENT DOCUMENTS

| | | |
|---|---|---|
| EP | 3214567 A1 | 9/2017 |
| WO | WO-2017139010 A2 | 8/2017 |

OTHER PUBLICATIONS

Fletcher, C., Ascend: An Architecture for Performing Secure Computation on Encrypted Data. MS Dissertation, Massachusetts Institute of Technology, Cambridge, MA, 2013.

(Continued)

*Primary Examiner* — Michael Pyzocha
(74) *Attorney, Agent, or Firm* — Blank Rome LLP

(57) ABSTRACT

The disclosure is generally directed to a method and apparatus for encrypting and decrypting data on an integrated circuit. In various implementations, the apparatus includes an on-chip high performance bus bridge that transparently encrypts and decrypts data between the embedded microprocessor(s) and off-chip system memory. In some implementations, the apparatus is optimized to the transactions generated by the processor's cache controller (e.g., optimized for cache line size) and optimized to the bus protocol being used. This provides code protection with minimal effect on system performance latency and throughput. The implementation of multiple cryptographic engines allows for encryption of a complete cache line while incurring only a single latency for the first cipher rounds to be completed.

18 Claims, 6 Drawing Sheets

(56) References Cited

U.S. PATENT DOCUMENTS

| | | | |
|---|---|---|---|
| 8,181,023 | B2 | 5/2012 | Sugiyama |
| 8,234,504 | B2 | 7/2012 | Cheung et al. |
| 8,356,188 | B2 | 1/2013 | Kudelski |
| 8,555,082 | B1 | 10/2013 | Bibikar et al. |
| 8,560,863 | B2 | 10/2013 | Munguia |
| 8,615,799 | B2 | 12/2013 | Henry et al. |
| 8,930,714 | B2 | 1/2015 | Glew et al. |
| 9,825,920 | B1* | 11/2017 | Yung ............ H04L 67/10 |
| 9,846,788 | B2 | 12/2017 | Oshida |
| 9,846,789 | B2 | 12/2017 | Boivie et al. |
| 9,881,161 | B2 | 1/2018 | Jang et al. |
| 9,954,681 | B2 | 4/2018 | Case et al. |
| 9,989,043 | B2 | 6/2018 | Lee et al. |
| 10,025,956 | B2 | 7/2018 | Basak et al. |
| 10,031,861 | B2 | 7/2018 | Chhabra et al. |
| 10,169,616 | B1 | 1/2019 | Nertney |
| 10,169,618 | B2 | 1/2019 | Van Antwerpen et al. |
| 2006/0059369 | A1 | 3/2006 | Fayad et al. |
| 2010/0115286 | A1* | 5/2010 | Hawkes ............ H04L 9/0618 713/189 |
| 2010/0299538 | A1* | 11/2010 | Miller ............... G06F 21/78 713/190 |
| 2011/0286596 | A1* | 11/2011 | Gressel .............. H04L 63/12 380/268 |
| 2013/0080790 | A1* | 3/2013 | Pean ............... G06F 12/1408 713/189 |
| 2013/0117577 | A1* | 5/2013 | Hars ................. G06F 21/85 713/190 |
| 2013/0129079 | A1* | 5/2013 | Swaminathan ....... H04L 9/0637 380/28 |
| 2013/0254906 | A1 | 9/2013 | Kessler et al. |
| 2014/0310536 | A1 | 10/2014 | Shacham |
| 2015/0074426 | A1* | 3/2015 | Jean ................. G06F 21/602 713/193 |
| 2016/0171249 | A1* | 6/2016 | Circello ............. H04L 9/0637 713/189 |
| 2016/0283748 | A1* | 9/2016 | Oh .................. G06F 21/52 |
| 2016/0378687 | A1* | 12/2016 | Durham ............. G06F 21/64 713/193 |
| 2017/0230338 | A1* | 8/2017 | Loprieno ............ H04L 63/04 |
| 2018/0183581 | A1 | 6/2018 | Elbaz et al. |
| 2018/0210858 | A1 | 7/2018 | Chu |
| 2018/0294968 | A1* | 10/2018 | Johnson ............. H04L 9/0643 |
| 2018/0365451 | A1* | 12/2018 | Ndu ................. G06F 21/72 |
| 2019/0050347 | A1* | 2/2019 | Bolotov ............. G06F 21/78 |

OTHER PUBLICATIONS

Hou, F., et al., "Bus and memory protection through chain-generated and tree-verified IV for multiprocessors systems", Future Generation Computer Systems, vol. 29, (2013), pp. 901-912.

\* cited by examiner

METHOD AND APPARATUS FOR ENCRYPTING AND DECRYPTING DATA ON AN INTEGRATED CIRCUIT

TECHNICAL FIELD

The disclosure relates generally to on-chip encryption and decryption techniques.

BACKGROUND

In the area of information security, bad actors have proved to be very persistent in their attempts to circumvent protection schemes. For example, sophisticated malfeasors have resorted to observing and analyzing executable code while it is still resident on external (non-integrated) memory devices. Such techniques make it possible to insert malicious code in order to gain access to financial, safety-related, or security-related information. Encryption of executable code remains one of the most effective ways to protect the code from tampering. However, encryption and decryption take up computing resources on devices using them and can potentially slow down operating system and application programs of such devices.

DRAWINGS

While the appended claims set forth the features of the present techniques with particularity, these techniques may be best understood from the following detailed description taken in conjunction with the accompanying drawings of which:

DESCRIPTION

The disclosure is generally directed to a method and apparatus for encrypting and decrypting data on an integrated circuit. In various embodiments, the apparatus includes an on-chip high performance bus bridge that transparently encrypts and decrypts data between the embedded microprocessor(s) and off-chip system memory. An embodiment of the apparatus is suited for execution of applications on secure systems and protecting software from unauthorized copying or alteration.

In an embodiment, the apparatus is optimized to the transactions generated by the processor's cache controller (e.g., optimized for cache line size) and optimized to the bus protocol being used. This provides code protection with minimal effect on system performance latency and throughput. The implementation of multiple cryptographic engines allows for encryption of a complete cache line while incurring only a single latency for the first cipher rounds to be completed.

According to an embodiment, a method for encrypting data on an integrated circuit involves receiving an instruction to write data to an address of a memory external to the IC; while the data is on the IC, encrypting the data based on a cryptographic function of the address and a nonce; and writing the encrypted data to the memory at the address.

According to an embodiment, a method for decrypting data involves reading encrypted data from an address of a memory external to the IC; generating a counter value based on a first nonce and the address; using the counter value to generate a first operand; using the first operand in a logical operation on the encrypted data to obtain a result; generating an initial value based on a second nonce and the address; using the initial value to generate a second operand; and using the second operand in a logical operation on the result to obtain decrypted data.

In an embodiment, an integrated circuit comprises: a counter value generator that generates a counter value based on a first nonce and a memory address; an initial vector generator that generates an initial vector based on a second nonce and the memory address; an encryption block that processes the counter value to generate a first operand; a linear feedback shift register that processes the initial vector in parallel with the encryption block processing the counter value to generate a second operand; logic elements that carry out logical operations on the data using the first operand and the second operand to generate encrypted data; and a bus that carries the encrypted data to the memory at the memory address, wherein the memory is outside of the integrated circuit.

Figure 1:
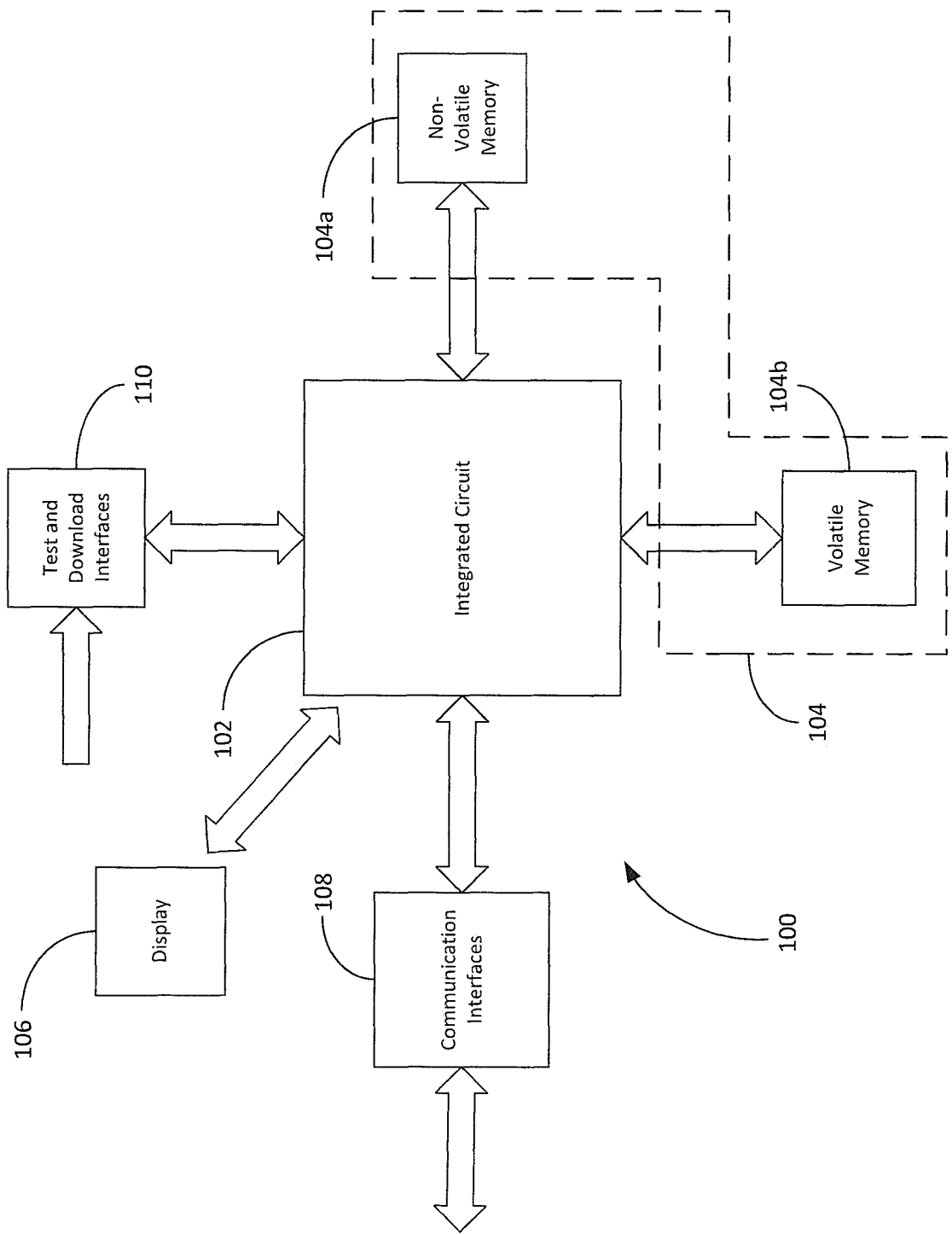
FIG. 1 is a block diagram of a basic hardware architecture of a computing device implemented according to an embodiment.

FIG. 1 illustrates a basic hardware architecture of a computing device implemented according to an embodiment. The computing device, generally labelled 100, includes an integrated circuit 102. As used herein, "integrated circuit" (or "IC") refers to a set of electronic circuits formed on a single chip (e.g., a silicon-based chip). Examples of an IC include a microprocessor, a controller, an application-specific integrated circuit ("ASIC"), a field-programmable gate array ("FPGA"), and a system on chip ("SoC"). The computing device 100 also includes memory 104, a display 106, one or more communication interfaces 108 (e.g., network communication interfaces (wired or wireless), maintenance interfaces, and user interfaces), and one or more test and download interfaces 110.

In the architecture depicted in FIG. 1, the memory 104 includes non-volatile memory 104a (e.g., flash memory, such NAND flash or NOR flash) and volatile memory 104b (e.g., random access memory ("RAM") such as double data rate ("DDR") synchronous dynamic RAM ("SDRAM")).

Figure 2:
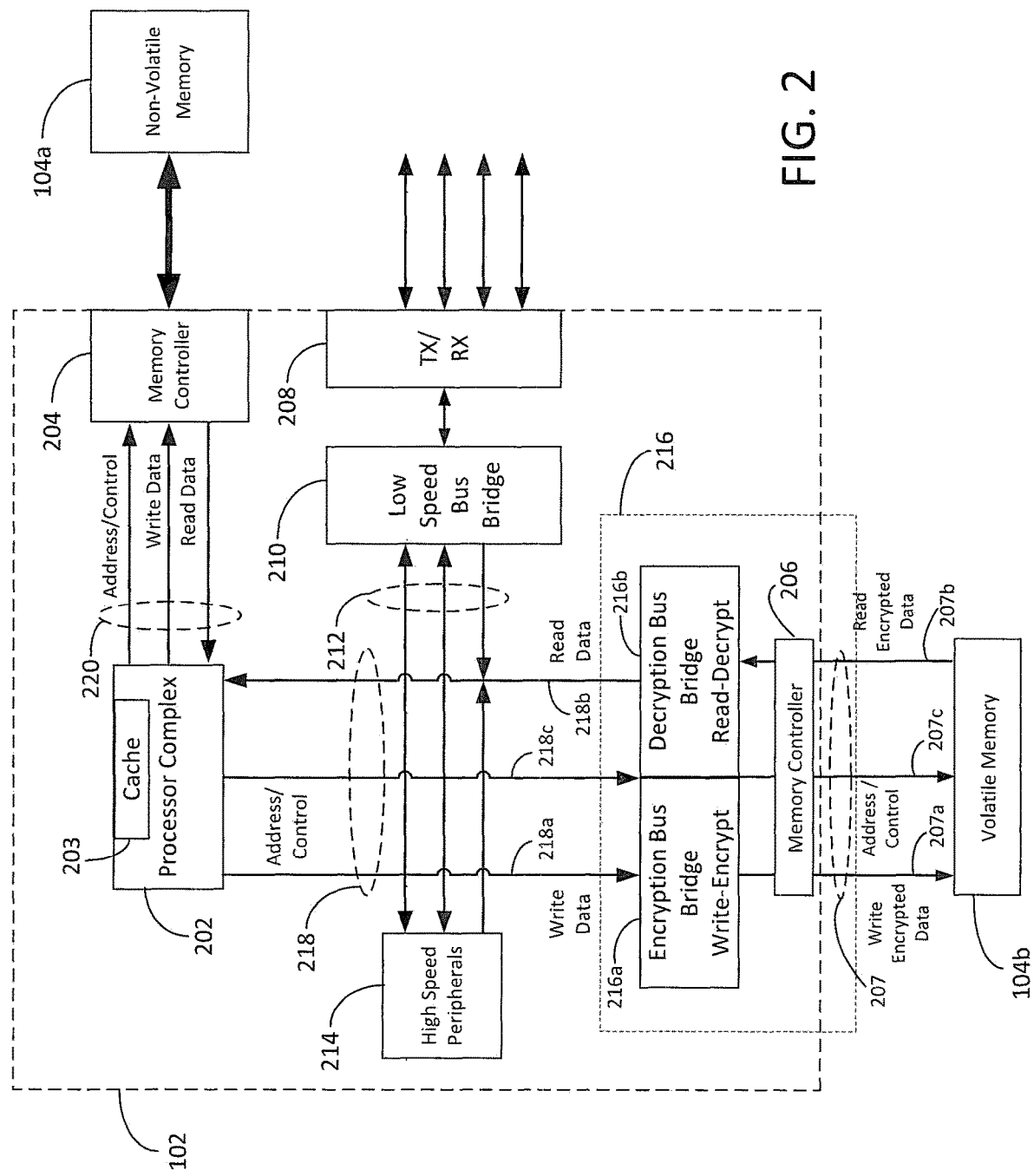
FIG. 2 is a block diagram of a basic architecture of an integrated circuit according to an embodiment.

Turning to FIG. 2, an architecture for the IC 102 according to an embodiment will now be described. In this embodiment, the IC 102 includes a processor complex 202 that controls the overall operation of the IC 102 and includes components such as cache memory 203 and bus bridges; a first memory controller 204 that controls read operations from and write operations to the non-volatile memory 104a; a second memory controller 206 that controls read operations from and write operations to the volatile memory 104b via a bus 207 (which includes a write data path 207a, a read data path 207b, and an address/control path 207c); a transmitter/receiver ("TX/RX") block 208 that includes components such as one or more universal asynchronous receiver-transmitters ("UARTs"), a Serial Peripheral Interface ("SPI"), and an I2C to support communication with low-speed components such as serial NOR flash memories and real-time clock ("RTC") chips; a low speed bus bridge 210 that bridges communications between the TX/RX block 208 and a bus 212; a high-speed peripherals block 214 that shares the bus 212 and includes components such as a Direct Memory Access ("DMA") controller, a graphics co-processor, and an Ethernet controller; and an encryption bus bridge 216 that encrypts data that is being written out to the volatile memory 104b and decrypts data that is being read in from the volatile memory 104b. The encryption bus bridge 216 includes a write-encrypt ("write") portion 216a and a read-decrypt ("read") portion 216b, which carry out the respective encrypting/writing and decrypting/reading operations of the encryption bus bridge 216.

The processor complex 202 and the encryption bus bridge 216 communicate with one another via a second bus 218. The second bus 218 includes a write data path 218a, a read data path 218b, and an address and control path 218c. The first memory controller 204 and the processor complex 202 communicate with one another via a third bus 220. In an embodiment, one or more of the buses 207, 212, 218, and 220 are split transaction buses (e.g., that use the ARM AXI protocol).

Figure 3A:
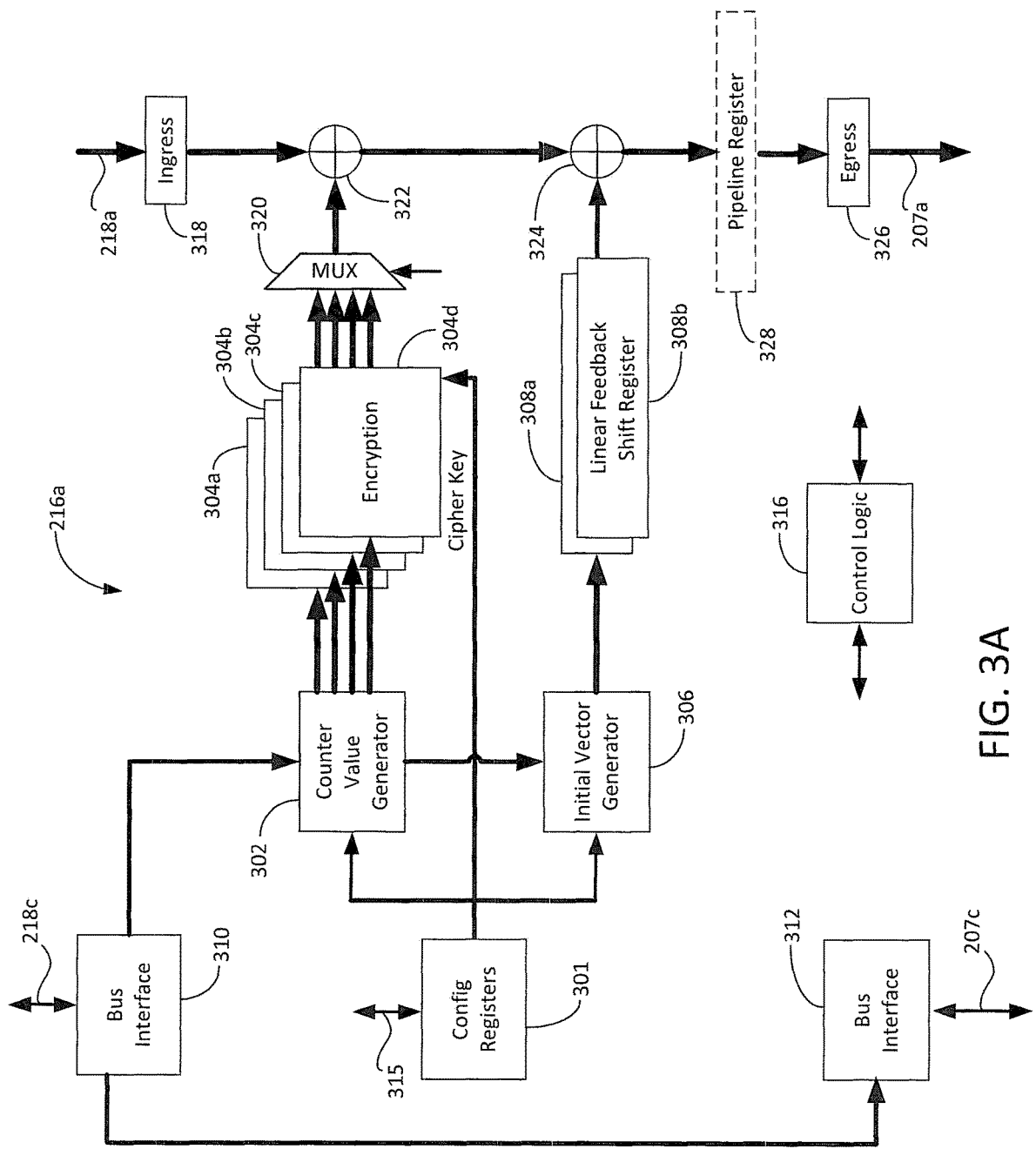
FIG. 3A is a block diagram of the encryption bus bridge of FIG. 2 according to an embodiment.

Turning to FIG. 3A (with appropriate references back to FIG. 2), the architecture of the write portion 216a according to an embodiment will now be described. The write portion 216a includes configuration registers 301 that store configuration data such as a cipher key, a nonce for the cipher initial counter value, and a nonce for the shift register initial value. The configuration registers 301 may receive the configuration data from another source on the IC 102 via a configuration bus 315. The write portion 216a also includes a counter value generator 302 that receives, as inputs, a bus cycle address ("memory address") from a bus interface 310 (e.g., split bus slave interface, which is communicatively linked to the address and control path 218c) as well as the nonce for the cipher initial counter value (from the configuration register 301) and generates a cipher initial counter value ("initial counter value") based on the memory address and the received nonce. After the counter value generator 302 generates the cipher initial counter value, it will continue to generate subsequent, distinct counter values. The write portion 216a further includes encryption blocks (also referred to herein as "cipher blocks") 304a, 304b, 304c, and 304d (e.g., advanced encryption standard ("AES") 128 or 256 CTR mode cipher), each of which receives the initial counter value (and subsequent counter values) from the counter value generator 302 and generates ciphertext based on the initial counter value. The ciphertext generated by the encryption blocks 304a-304d is used to generate a first operand. In particular, the ciphertext generated by the encryption blocks 304a-304d is multiplexed by a multiplexor ("MUX") 320, resulting in the first operand.

Continuing with FIG. 3A, the write block 216a further includes an initial vector ("IV") generator 306 that receives the nonce for the shift register initial value from the configuration registers 301, receives a memory address passed through by the counter value generator 302, and generates an initial value (e.g., a pseudorandom value) based on the received nonce and memory address; a first linear feedback shift register 308a and a second linear feedback shift register ("LFSR") 308b that generate a pseudorandom value based on the IV. The write portion 216a further includes a bus interface 312 (e.g., split bus master interface) that is communicatively linked to the address and control path 207c. In an embodiment, the cache memory 203 has 64 byte cache lines and uses 16 byte blocks, and therefore four cipher block instances are used as the encryption blocks 304a-304d.

Still referring to FIG. 3A, the architecture of the write portion 216a further includes a control logic block 316 (e.g., a finite state machine) that initializes the initial counter value generator 302, initializes the encryption blocks 304a-304d, initializes the IV generator 306, and controls the sequencing of the counters, ciphers, shift registers, and data storage elements (ingress and egress); an ingress buffer 318 (e.g., data first in first out ("FIFO") 8 deep and 2×8 bytes wide) that is communicatively linked to the write data path 218a and receives, from the processor complex 202, data to be encrypted (e.g., data from one cache block at a time); a first XOR block 322 (e.g., counter ("CTR") mode, block sized XOR) that carries out an XOR operation on data received from the ingress buffer 318 and the first operand (i.e., the multiplexed ciphertext); a second XOR block 324 (e.g., CTR mode, block sized XOR) that carries out an XOR operation on the output (result) of the first XOR block 322 and the second operand (i.e., the pseudorandom value that is output from each of the LFSRs 308a and 308b); and an egress buffer 326 (e.g., data FIFO 8 deep and 2×8 bytes wide) that is communicatively linked via the write data path 207a to the volatile memory 104b. In some embodiments, the architecture of FIG. 3 also includes a pipeline register 328 that holds the output of the second XOR block 324 and then provides the output to the egress buffer 326.

Figure 3B:
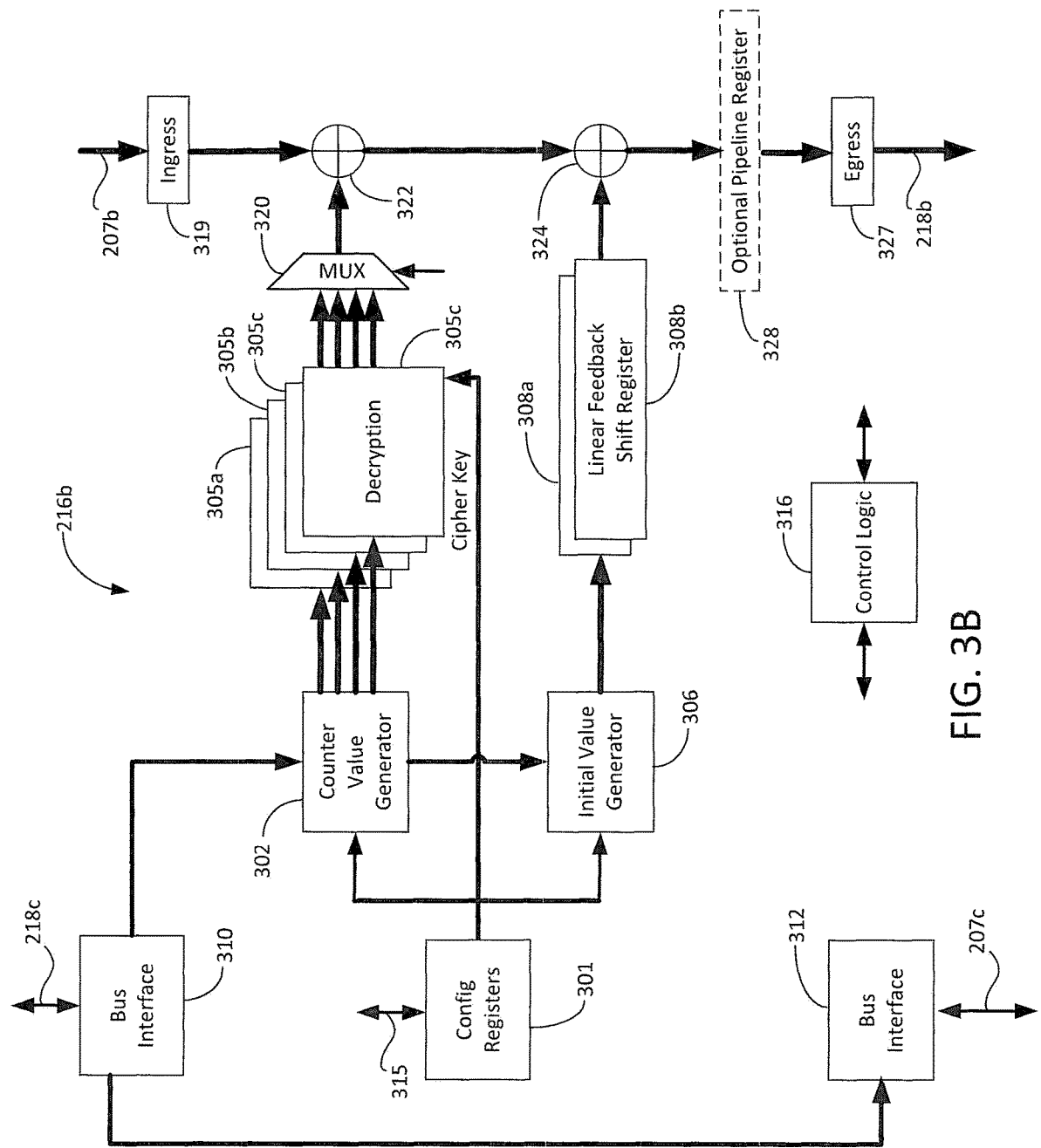
FIG. 3B is a block diagram of the decryption bus bridge of FIG. 2 according to an embodiment.

To read encrypted data back in from the volatile memory 102b, the IC 102 uses the read portion 216b. Turning to FIG. 3B, the architecture for the read portion 216b according to an embodiment is shown. The architecture is nearly identical to that shown in FIG. 3A for the write portion 216a with the following exceptions: (1) An ingress buffer 319 is communicatively linked to the read data path 207b. (2) An egress portion 327 is communicatively linked to the read data path 218b. (3) There are decryption blocks 305a-305d instead of encryption blocks. For example, when encrypted data is read into the IC 102 from the memory 104b, the counter value generator 302 generates an initial counter value based on a nonce received from the configuration registers 301 and on a memory address received from the bus interface 310. The initial counter value is provided to the decryption blocks 305a-305d, which use the initial counter value and the cipher key (received from the configuration registers 301) to generate a first operand. In particular, the MUX 320 multiplexes ciphertext output by the decryption blocks to create the first operand. This process is repeated with subsequent addresses (and additional, distinct counter values after the initial counter value are created).

In parallel with this process, the IV generator 306 generates an initial value based on the nonce that it receives from the configuration registers 301 and on the address that it receives from the counter value generator 302, provides the initial value to LFSRs 308a and 308b, which use the initial value to generate a split (i.e., the second operand).

The XOR block 322 XORs the incoming encrypted data to generate a result, which is passed on to the XOR block 324. The XOR block 324 XORs the result with the second operand, resulting in unencrypted data.

A process by which encrypted code is initially stored on the device 100 according to an embodiment will now be described. The process starts when the device 100 is in a manufacturing facility, at which a factory application image (e.g., an application that performs security for internet communications (such as IPSec) or financial transaction processing within a secure server) ("factory image") is loaded into the non-volatile memory 104a via the test and download interfaces 110. At this point, the factory image is plaintext (unencrypted). Next, the IC 102 reads in the plaintext factory image, encrypts the plaintext factory image to create a ciphertext factory image, and writes the ciphertext factory image back out to the non-volatile memory 104a. Subsequently, (e.g., during normal operation of the device 100), the IC 102 carries out a system boot in which it initializes and keys the encryption bridge 216, copies the ciphertext factory image into temporary memory (e.g., cache memory), which it may do all at once or a certain number of bytes at a time, and decrypts the factory image (all at once or a certain number of bytes at a time) into plaintext. The IC 102 then (either subsequently or in parallel with reading in and decrypting the ciphertext) encrypts the plaintext (using the encryption bus bridge 216) and writes the resulting ciphertext out to the volatile memory 102b.

In an embodiment, the system boot in which the IC 102 initializes and keys the encryption bus bridge 216 occurs as follows: The IC 102 re-generates the key to decrypt the flash image using key material stored within the IC 102 or within devices in communication with the IC 102, such as one-time programmable ("OTP") bits, values held in battery-backed memories, etc. The IC 102 re-generates the key for the flash image, decrypts the image, then stores the image to high-performance memory using the encryption bus bridge 216. Another possible implementation would be to share the encryption/decryption bus bridges between the two data flows, using different keys for each memory.

Figure 4:
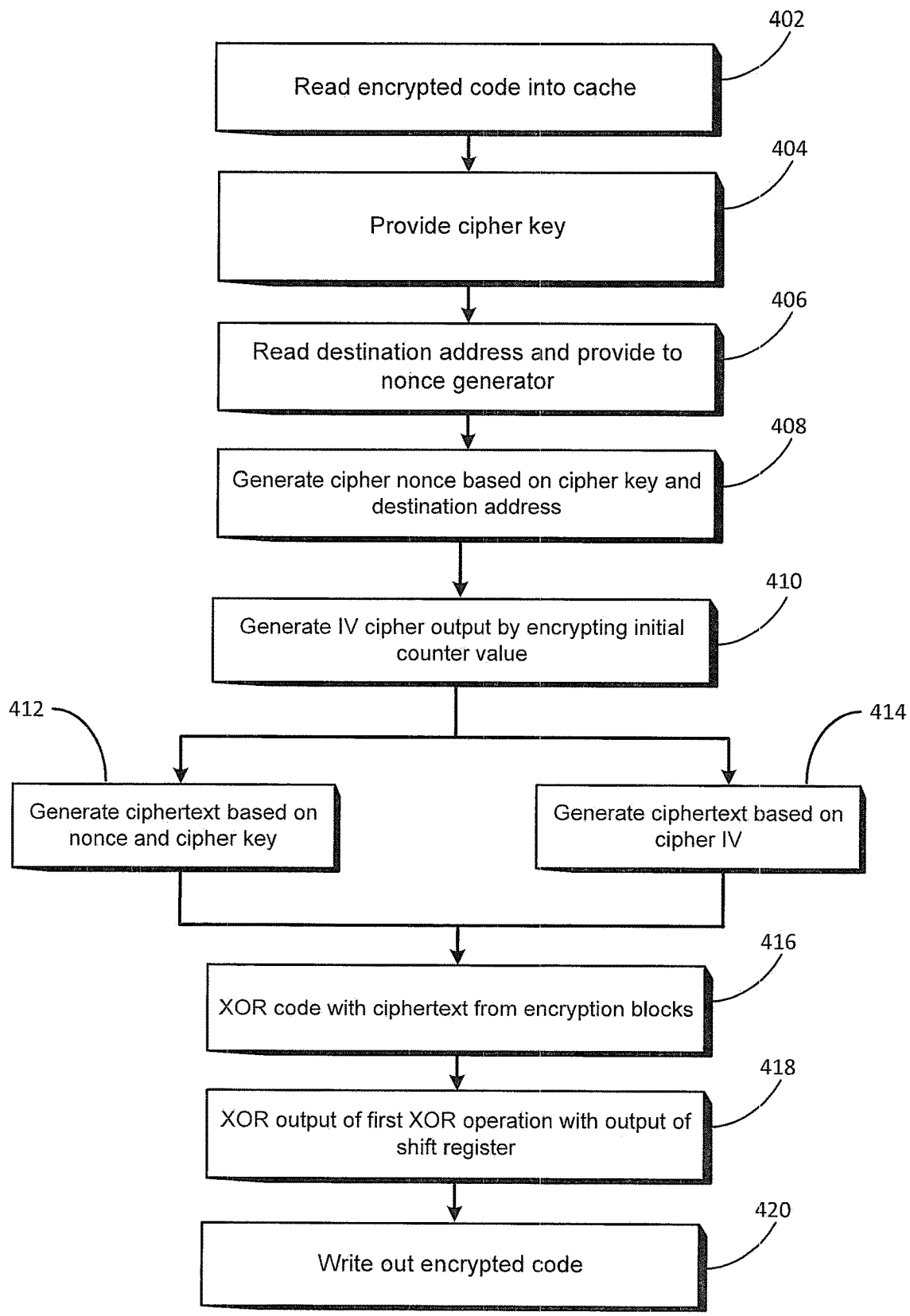
FIG. 4 is a flow diagram of a procedure for encrypting data according to an embodiment.

Turning to FIG. 4, a procedure carried out by the IC 102 to encrypt code according to an embodiment will now be described. The process is initiated in response to an application of the device 100 (which resides in the non-volatile memory 104a in encrypted form) being executed in the usual way and the application issuing an instruction to write to an address in external memory (e.g., the non-volatile memory 104a or the volatile memory 104b). From the point of view of the operating system of the device 100, it is merely pulling in executable code into volatile memory and executing the code. At 402, the processor complex 202 reads the encrypted code into the cache memory 203, which is organized into lines (for example, in 64 byte lines), and initiates commands to write the code into the volatile memory 104b. At 404, the processor complex 202 provides a cipher key to the configuration registers 301 via the configuration bus 315. Also, in parallel with the process and beginning at 404, the control logic 316 enables all of the encryption blocks 304a-304d as part of the initialization process and copies the cipher nonce into the counter value generator 302 At 406, the bus interface 310 reads the destination address (from the address and control line 218c) of the code (e.g., of the line of code coming from the cache memory 203) and provides that address to the counter value generator 302. At 408, the counter value generator 302 logically combines the cipher nonce and a permutation of the address to generate the initial counter value for the first cipher block (304a). It then auto-increments a local copy of the address to the next cache line value, and generates the initial counter value for the second cipher block (304b), and so on for all four cipher blocks. (Subsequent counter values are created in the same manner.) An example of an algorithm that could be used to accomplish this is as follows. This example assumes that the cipher nonce is 64 bits and the resulting initial count value will be 128 bits. The cipher nonce [63:0], bus address [31:0], and cipher block counter [31:0] are concatenated. The cipher block counter is assumed to be integrated into the cipher itself and is incremented for each cipher block (16 bytes) into the cipher. There are ways to cause more bits to change, for example if the DDR memory has a range from 0x0 to 0x1000_0000 (256 MB), the process might exchange bits [31:29], which will not change, with address bits that change more often, such as [13:11].

At 410, the IV generator 306 receives the initial counter value from the cipher initial counter value generator 302, and generates a cipher output by encrypting the initial counter value. Examples of reference equations for transforms that could be used to accomplish this can be found in section 6.5 of the NIST Recommendation for Block Cipher Modes of Operation published by the Computer Security Division of the Information Technology Laboratory, which is part of the National Institute of Standards and Technology and are reproduced here:

| CTR Encryption: | $O_j = CIPH_K(T_j)$ | for $j = 1, 2 \ldots n$; |
| | $C_j = P_j \oplus O_j$ | for $j = 1, 2 \ldots n-1$; |
| | $C^*_n = P^*_n \oplus MSB(O)$. | |
| CTR Decryption: | $O_j = CIPH_K(T_j)$ | for $j = 1, 2 \ldots n$; |
| | $P_j = C_j \oplus O_j$ | for $j = 1, 2 \ldots n-1$; |
| | $C^*_n = P^*_n \oplus MSB_n(O_n)$. | |

At 412, the cipher blocks 304a-304d read the cipher key from the configuration registers 301 and generate ciphertext based on the initial counter value and the cipher key (for example, by using an AES algorithm). In parallel with the cipher blocks generating ciphertext, at 414 the LFSRs 308a and 308b generates an unrelated cipher split value based on the cipher output received from the IV generator 306. The LFSRs 308a and 308b advance for each cycle of the cipher round calculation, resulting in 10 advances to match the 10 rounds for the first ciphertext result. The actual code coming in from the cache memory 203 is received by the ingress buffer 318. At 416, the first XOR block 322 carries out an XOR operation on the value output by the cipher block 304a with the first 16 bytes of the data from the ingress buffer 318. At 418, the second XOR block 324 carries out an XOR operation on the split received from the LFSRs 308a and 308b (e.g., in a staggered manner) and the output of the first XOR block 322. The result is a ciphertext version of the data originally received by the ingress buffer 318. At 420, the egress buffer 326 writes out the ciphertext version of the data to the volatile memory 104b. The flow set forth in FIG. 4 continues until the application or operating system of the device 100 has written enough out to memory.

Figure 5:
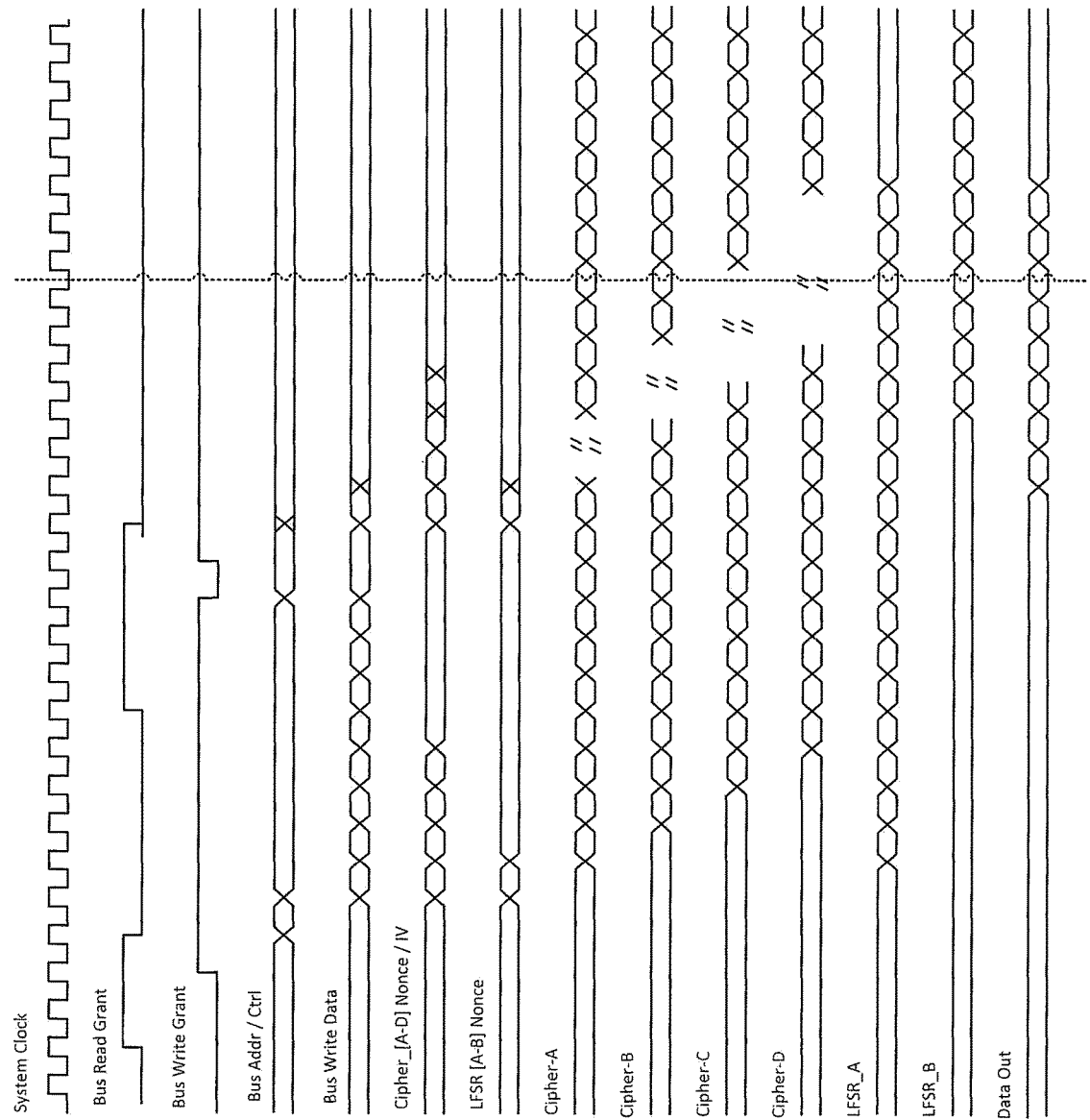
FIG. 5 show timing diagrams of the procedure set forth in FIG. 4 according to an embodiment.

It should be noted that the process described above in conjunction with FIG. 4 is carried out with each of the remaining cipher blocks 304a-304d, but in a staggered manner. For example, staggered after the operation of on the output of the cipher block 304a, the output of the second cipher block 304b is combined with the second block of 32 byte data from the ingress buffer 318, with the multiplexor 320 changing the output data based on control from the control logic 316. This continues until all 64 bytes of cipher output have been used at the most one time, resulting in a 64 bytes of encrypted in the egress buffer 326. Since multiple cache lines may be written consecutively to external memory, the control logic 316 determines when the first cipher block 304a is again available, pre-emptively generates a new initial counter value, and enables the first cipher block 304a to generate the values for the next cache line. Likewise, the control logic 316 causes a new shift register initial value to be generated to be used in the second LFSR 308b, and enables the second LFSR 308b to advance such that both the cipher value and the shift register value are available for the second (consecutive) cache line with minimal latency. FIG. 5 shows the output state of the first LFSR 308a as LFSR_A and the output state of the second LFSR 308b as LFSR_B.

Turning to FIG. 5, timing diagrams for an embodiment of the process described in conjunction with FIG. 4 are shown. The diagrams for the encryption blocks 304a-304d are shown as "Cipher-A" through "Cipher-D," while the timing diagrams labeled "LFSR_A" and "LFSR_B" represent the first LFSR 308a and the second LFSR 308b.

Possible applications of the apparatus and method described herein include a network encryption device, where the device encrypts Ethernet packets at a trusted initiator on one end of a connection, traverses the untrusted internet as encrypted, and is decrypted at the trusted terminal device. For this application, the Ethernet ports on the device would include an additional encryption/decryption block dedicated to the Ethernet interfaces. Another possible application is a secure smart phone. Still another application is data-at-rest, where an external high density storage drive (local or remote) stores data in encrypted form. This would entail a storage fabric with dedicated encryption/decryption and with, for example, serial ATA, SAS, or PCIe connectivity.

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope as set forth in the following claims. For example, the actions described herein can be reordered in ways that will be apparent to those of skill in the art.

What is claimed is:

1. A method for encrypting data on an integrated circuit (IC), the method comprising:
   receiving an instruction to write data to an address of a memory external to the IC;
   while the data is on the IC, encrypting the data based on a cryptographic function of the address and a nonce, comprising:
      generating a counter value based on the nonce and the address, wherein a local copy of the address is automatically incremented to a next cache line value;
      using the counter value to generate an operand;
      using the operand in a logical operation on a block of the data;
      generating an initial value based on a second nonce and the incremented local copy of the address;
      using the initial value to generate a second operand; and
      using the second operand in a second logical operation on the data; and
   writing the encrypted data to the memory.

2. The method of claim 1, wherein using the counter to generate an operand comprises processing the counter through a cipher block.

3. The method of claim 2, wherein the cipher block has a processing throughput that is based on a block size of a cache memory from which the block of data has been pulled.

4. The method of claim 1, wherein using the initial value to generate a second operand comprises processing the initial value through a linear feedback shift register.

5. The method of claim 1, wherein using the operand in a logical operation on a block of the data comprises XOR-ing the operand with the block of data to create ciphertext and using the second operand in a second operation comprises of the data comprises XOR-ing the second operand with the ciphertext.

6. The method of claim 5, further comprising writing a result of the XOR-ing the second operand with the ciphertext to the memory at the address.

7. A method for decrypting data on an integrated circuit (IC), the method comprising: reading encrypted data from an address of a memory external to the IC;
   generating a counter value based on a first nonce and the address, wherein a local copy of the address is automatically incremented to a next cache line value;
   using the counter value to generate a first operand;
   using the first operand in a logical operation on the encrypted data to obtain a result;
   generating an initial value based on a second nonce and the incremented local copy of the address;
   using the initial value to generate a second operand; and
   using the second operand in a logical operation on the result to obtain decrypted data.

8. The method of claim 7, wherein using the counter to generate an operand comprises processing the counter through a cipher block.

9. The method of claim 8, wherein the cipher block has a processing throughput that is based on a block size of a cache memory from which the block of encrypted data has been pulled.

10. The method of claim 7, wherein using the initial value to generate a second operand comprises processing the initial value through a linear feedback shift register.

11. The method of claim 7, wherein using the first operand in a logical operation on the encrypted data comprises XOR-ing the operand with the encrypted data to generate a result and using the second operand in a logical operation on the result comprises XOR-ing the second operand with the result.

12. The method of claim 7, wherein
   using the counter to generate an operand comprises processing the counter through a cipher block; and
   using the initial value to generate a second operand comprises processing the initial value through a linear feedback shift register in parallel with processing the counter through the cipher block.

13. An integrated circuit (IC) for encrypting data within the integrated circuit, the integrated circuit comprising:
   a counter value generator that generates a counter value based on a first nonce and a memory address;
   an initial vector generator that generates an initial vector based on a second nonce and the memory address;
   an encryption block that processes the counter value to generate a first operand;
   a linear feedback shift register that processes the initial vector in parallel with the encryption block processing the counter value to generate a second operand;
   logic elements that carry out logical operations on the data using the first operand and the second operand to generate encrypted data in a staggered manner; and
   a bus that carries the encrypted data to the memory at the memory address, wherein the memory is outside of the IC.

14. The integrated circuit of claim 13, wherein the encryption block is an AES 128 encryption block.

15. The integrated circuit of claim 13, wherein the encryption block is one of a plurality of encryption blocks, and wherein the counter value generator generates a plurality of different counter values for the plurality of encryption blocks.

16. The integrated circuit of claim 13, wherein the linear feedback shift register is one of a plurality of linear feedback shift registers that processes the initial vector to generate the second operand.

17. The integrated circuit of claim 13, wherein the logic elements comprise a first XOR block that XORs the first operand with the data to obtain a first result and a second XOR element that XORs the second operand with the first result to obtain a second result, which constitutes the encrypted data.

18. The integrated circuit of claim 17, wherein the bus carries the encrypted data to a memory controller, which writes the encrypted data out to the memory.

* * * * *